Dec. 8, 1953  H. J. LOVENSTON  2,661,539
GAUGE UNIT
Filed Aug. 1, 1949

INVENTOR.
Hans J. Lovenston
BY
Barnes, Kisselle, Laughlin, Raisch
Attorneys.

Patented Dec. 8, 1953

2,661,539

UNITED STATES PATENT OFFICE 2,661,539

GAUGE UNIT

Hans J. Lovenston, Detroit, Mich.

Application August 1, 1949, Serial No. 107,846

17 Claims. (Cl. 33—172)

1

This invention relates to a gaging apparatus and has to do more particularly with a gage unit for indicator gaging equipment.

It is an object of this invention to produce a gage unit for an indicator which is constructed so as to be usable with various mountings and measuring extensions for different types of gaging operations; that is, the gage unit of this invention is provided with a removable base and measuring extensions which adapt it for use as a depth gage, surface gage, or other gages of special design.

Another object of the invention is to produce a gage unit for an indicator designed to permit a measuring extension to be usable over a substantial measuring range.

The invention contemplates a gage unit for an indicator which permits gaging in a new and improved manner and which is constructed to prevent injury to the delicate mechanism of the indicator during both the setting and gaging operations.

It is also contemplated to produce a gage unit on which an indicator is adapted to be mounted, the gage being provided with means permitting the indicator to be optionally connected with or disconnected from the operating mechanism of the gage so that when the gage is being adjusted to the initial setting, the indicator may be disconnected from the gage operating mechanism and the possibility of injury to the delicate mechanism of the indicator is thereby eliminated.

Another object of the invention is to produce a gage unit for an indicator having a reciprocable plunger for actuating the indicating mechanism of the indicator, the plunger being provided with means for adjusting the indicator at a desired setting relative to a fixed position of the plunger.

Another object of the invention is to produce a gage unit for an indicator having a reciprocable plunger arranged to operate the indicating mechanism of the indicator and also having a member associated with the plunger for moving the plunger to and from the work contacting position.

A further object of the invention resides in the provision of means for holding the plunger in a rigid locked position in the body of the gage so that any shock or strain imparted to the plunger will be absorbed by the body of the gage unit and not transmitted to the delicate operating mechanism of the indicator with which the plunger is operatively connected.

In the drawings:

Figure 1 is a front elevation of the gage unit

2 of this invention, shown as it is used with a dial indicator and positioned on a master setting gage.

Figure 1:
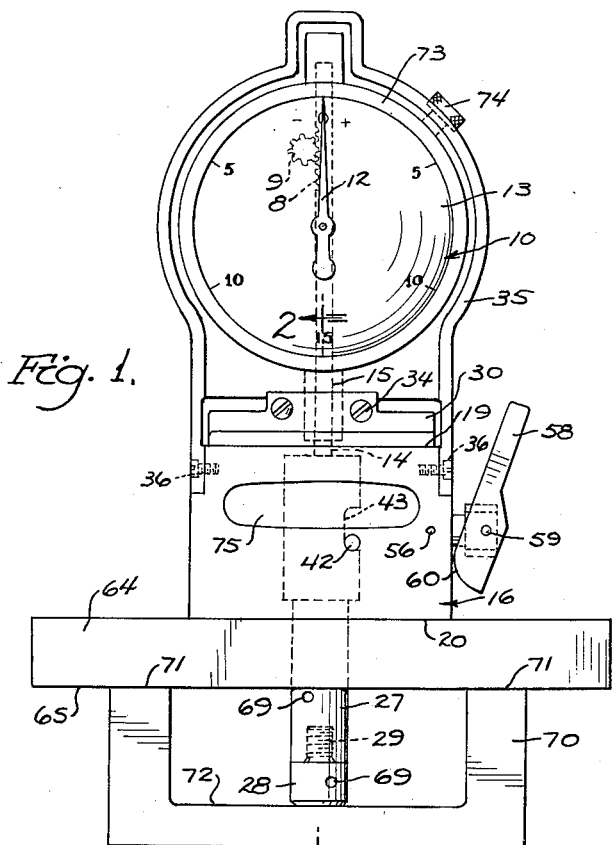

In the drawings, the gage unit of this invention is shown in conjunction with a dial indicator 10. The indicator 10 does not form a part of this invention, but since my gage is shown for use with a dial indicator, its construction will be briefly described. It includes a casing 11 which houses an indicating mechanism which when actuated causes the pointer or arrow 12 to indicate a reading on the graduated face 13 of the dial. The indicating mechanism includes a pinion 9 which is arranged to be actuated by a rack 8 on a stem 14 which is reciprocably mounted and biased to project outwardly of casing 11 within a sleeve 15. Pinion 9 is, of course, operatively connected with pointer 12 through some delicate mechanism not shown. The particular dial indicator illustrated and the operating mechanism therefor are of conventional design and are shown merely for the purposes of illustration, it being understood that the gage unit of this invention is adapted for use with indicators of different construction.

The gage unit of my invention comprises a body 16 which is provided with a central bore 18 extending through body 16 from the upper to the lower face thereof, 19 and 20 respectively. Within bore 18 there is slidably arranged a plunger 22 having a close fit with the cylindrical wall of bore 18. At its upper end plunger 22 is provided with a central socket 23 having a reduced portion 24 which is threaded to receive an adjusting screw 25. The lower end of plunger 22 is provided with a threaded bore 26 of greater diameter than the reduced portion 24 and providing access to the head of screw 25 from the lower end of the plunger. Within the threaded bore 26 at the lower end of plunger 22 there is threaded a plunger extension 27 which in turn is adapted to receive a further extension 28 as by means of the threaded socket 29 at the lower end of extension 27.

Dial indicator 10 is arranged to be supported on body 16 by means of a cap member 30 which is secured on body 16 as by cap screws 31. On its lower face cap 30 is provided with a centrally disposed pilot 32 which projects into and has a close fit with the upper end of bore 18 in body 16. The upper portion of cap 30 is provided with a split bearing 33 concentric with pilot 32. Bearing 33 is adapted to receive sleeve 15 of indicator 10 with stem 14 projecting into socket 23 at the upper end of plunger 22. Stem 14 and plunger 22 are adapted to be operatively connected as by threading screw 25 upwardly until the upper end of the screw contacts the lower end of the stem. Bearing 33 is arranged to be contracted and clinched around sleeve 15 by screws 34 which extend across the split portions of the bearing. A guard 35, extending around the exposed portions of the indicator, is supported on body 16 by screws 36.

Figure 2:
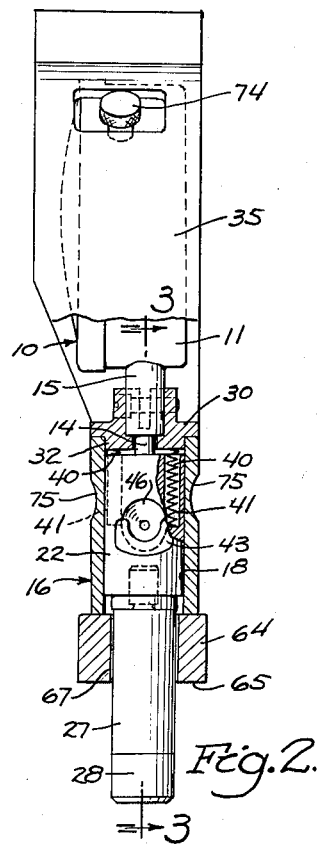
Figure 2 is a side elevation, partly in section of the gage unit assembly shown in Figure 1.

Plunger 22 is normally biased in a downward direction by means of a pair of coil springs 40 which are retained within centrally offset sockets 41 in the plunger and which act between the lower end of sockets 41 and the lower face of pilot 32 as is best shown in Figure 2. A pin 42 extending transversely through bore 18 is engaged within a recessed slot 43 in plunger 22 to limit the extent of upwardly and downwardly movement of the plunger. Pin 42 also prevents the plunger from rotating relative to body 16. Slot 43 is dimensioned to permit plunger 22 to move upwardly and downwardly a distance in excess of the operating range of the gage unit.

On opposite sides thereof plunger 22 is provided with opposed conical openings 45 and 46. A screw 47 having a conically shaped end portion 48 is threaded into body 16 so that the conically shaped head portion 48 can be advanced into or retracted out of conical opening 45 in plunger 22. Screw 47 is adjustable inwardly and outwardly to limit the movement of plunger 22 in an upwardly direction by contact with the lower inclined wall of opening 45. The conical end 50 of locking stud or plunger 52 projects into opening 46. Plunger 52 is slidably arranged within a bore 53 in body 16 which extends in a direction transversely of and intersects with bore 18. Plunger 52 is normally biased inwardly into engagement with the upper inclined wall of opening 46 by means of a compression spring 54 which is disposed within an axially extending socket 55 within the plunger 52. Spring 54 acts at one end against the inner end of socket 55 and at the other end against a pin 56 in body 16 which extends transversely through bore 53 and an elongate slot 57 in plunger 52. Plunger 52 is arranged to be retracted out of engagement with the inclined wall of opening 46 by means of a handle 58 which is pivotally mounted at the outer end of plunger 52 as by a pin 59. Handle 58 is fashioned at one end with a cam surface 60 which, when the handle is pivoted to the horizontal position, engages the outer end face of body 16 and shifts plunger 52 outwardly. It will be noted that when handle 58 is released to engage the conical head 50 of plunger 52 with the upper inclined wall of opening 46, plunger 22 is forced upwardly until contact is established between the lower inclined wall of opening 45 and the conical end 48 of stop screw 47 and plunger 22 is thereby effectively locked in bore 18.

Figure 5:
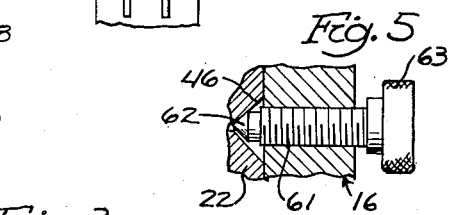
Figure 5 is a fragmentary sectional view showing a modified form of plunger locking member.

In Figure 5 there is illustrated a modified form of locking member for plunger 22. In this modification a screw 61 having a conically shaped head 62 is threaded into body 16 so that the conically shaped head 62 can be advanced into engagement with the upper inclined wall of opening 46. At its outer end screw 61 is provided with an enlarged knob portion 63 for actuating the screw by hand.

For the purposes of illustration the gage unit is shown in the drawing set up for use as a depth gage. This type of gage is used for checking the distance between two spaced surfaces. The gage is adjusted to the correct distance to be checked between the two surfaces on the work piece by means of a master set up gage on which the precise distance to be checked has been reproduced and the work is checked by comparison with the master gage. Accordingly, a base member 64 having a planar gaging surface 65 on the lower face thereof is secured on the lower face 20 of body 16 as by cap screws 66. It will be appreciated, of course, that the lower face 20 of body 16 may be employed as the planar gaging surface if desired, the removable base 64 being provided simply to render the gage more universal in use. Base 64 is centrally apertured as at 67 to receive plunger extensions 27 and 28, the gaging surface 65 being machined to lie in a plane perpendicular to the axis of bore 18. It will be appreciated that other bases may be provided for accommodating the gage unit for other types of gaging operations. It will also be noted that combinations of plunger extensions may vary widely in design according to the requirements of a particular gaging operation and that plunger 22 may be employed to fulfill the functions of extensions 27 and 28 by simply extending the lower end thereof the required distance below gaging surface 65 or the lower face 20 on body 16.

Figure 3:
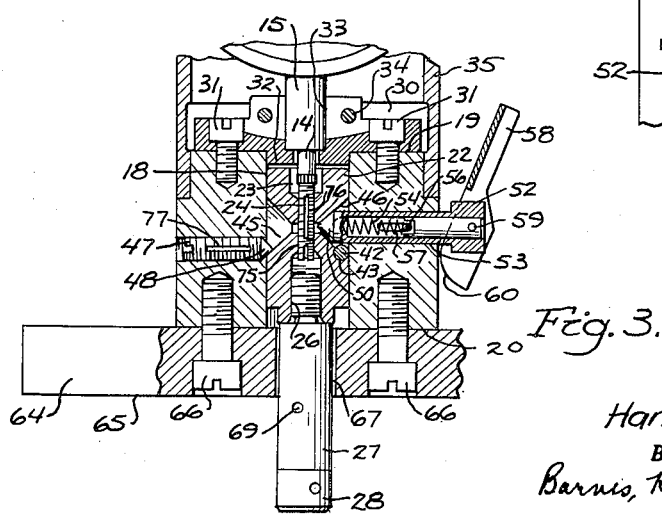
Figure 3 is a fragmentary sectional view taken along the lines 3—3 in Figure 2.
Figure 4:
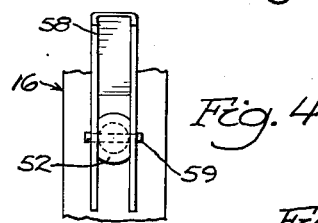
Figure 4 is a fragmentary end view of the gage unit showing the locking plunger handle.

When it is desired to set the gage for measuring the depth of a hole or the like in a work piece, plunger extensions 27 and 28 are first removed from the end of plunger 22. For this purpose the plunger extensions are provided with transverse holes 68 through which a rod or like tool can be inserted for turning the extension. Plunger 22 is prevented from turning by means of pin 42 which is engaged within recess 43. After extensions 27 and 28 are removed from the end of the plunger a screw driver is inserted into bore 26 at the lower end of the plunger and screw 25 is withdrawn out of contact with the stem 14 of the indicator while the plunger is in the locked position as shown in Figure 3. It will be appreciated that this precaution is taken so that while plunger 22 is subsequently being adjusted to a particular setting, the dial indicator is effectively disconnected from the gage and any shock on plunger 22 will not be transmitted to stem 14 and in turn to the delicate indicating mechanism of the indicator. The possibility of strain and injury to the indicator due to overtravel of stem 14 beyond the range limit of the indicator is also eliminated. Extensions 27 and 28, having been previously selected as falling within the range of measurement desired, are then reassembled on plunger 22. In this condition the gage assembly is placed upon a master set up gage 70 with the gaging surface 65 of base 64 resting on one functional surface 71 of the master gage. Handle 58 is then pivoted downwardly to retract plunger 52 and permit plunger 22 and extensions 27 and 28 to move downwardly under the influence of compression springs 40 until the lower end of extension 28 contacts the other functional surface 72 of the master gage. Surfaces 71 and 72 are, of course, spaced perpendicularly apart a distance corresponding to the correct depth of the surfaces to be measured on the work piece. The return stop screw 47 is then threaded inwardly until its conical head portion 48 contacts the lower inclined wall of opening 45.

After the gage has been initially set in this manner, plunger extensions 27 and 28 are again removed. A screw driver is then inserted in threaded bore 26, engaged with the end of adjusting screw 25 and pushed inwardly of the gage body until the lower inclined surface of opening 45 contacts the conical end portion 48 of screw 47. With the plunger in this position, adjusting screw 25 is threaded inwardly until contact is established with the end of stem 14. The inward adjustment of screw 25 is continued to a point where arrow 12 indicates on the face of the dial that approximately half of the total range of the indicator has been reached. Plunger extensions 27 and 28 are again reassembled on plunger 22 and return stop screw 47 is withdrawn slightly so as to permit the plunger to move upwardly beyond its previous setting but to a point within the safe operating range of the indicator which can be determined by the reading of pointer 12 on the face of the dial. This permits both the plus and minus dimensional variations of the work piece to register on the indicator dial. It will also be noted that adjusting screw 25 is in a tamper proof enclosure after assembly of extensions 27 and 28 on plunger 22. After screw 47 is withdrawn handle 58 is released to permit plunger 52 to move inwardly under the influence of compression spring 54. In so doing, the conical head 50 of plunger 52 engages the upper inclined surface of opening 46 and holds plunger 22 in a retracted and locked position.

The gage is then placed on the master set up gage as previously described and handle 58 is slowly pivoted downwardly so that plunger 22 is is permitted to move slowly in a downward direction under the influence of springs 40 until the lower end of extension 28 contacts the lower functional surface 72 of the master gage. The indicator dial 13, which is adjustable in a rotary direction by turning an outer rim member 73, is then rotated so that the zero mark coincides with arrow 12. The dial is locked in this position by means of a locking screw 74. Thereafter locking handle 58 is again released to permit plunger 52 to move inwardly and thereby force plunger 22 upwardly until the lower inclined face of opening 45 engages the conical head 48 of stop screw 47. The gage is then in a set condition for checking the desired dimensions of the work piece. Screws 25 and 47 are initially slotted and expanded as at 76 and 77, respectively, to obtain a substantial friction tight fit so that they will not be accidentally moved out of adjustment.

In checking the dimensions of a work piece, the gage is set on the work piece with gaging surface 65 of base 64 resting on the accurately machined surface of the work piece from which the desired distance of the other surface is to be measured. In order to facilitate handling of the gage conveniently, body 16 is recessed at each side thereof as at 75 at which portions the gage may be gripped firmly. Plunger 22 is then released by pivoting handle 58 downwardly, or in the case of the modified construction shown in Figure 5, by turning knob 63 so as to thread screw 61 outwardly. Plunger 22 is thereby forced downwardly by springs 40 until the lower end of extension 28 contacts the bottom of the hole or other surface being gaged. The distance between the two surfaces will then be indicated by the position of the indicator pointer with reference to the zero mark on the dial.

It will be appreciated that since the plunger assembly always moves downwardly from the locked position, the gage unit of this invention provides a more uniform mode of gaging since the velocity of the downward movement of the plunger can be readily controlled by regulating the rate at which the locking plunger 52 or locking screw 61 is withdrawn from engagement with plunger 22. This controlled release of plunger 22 has an important effect on the indicator mechanism since uncontrolled velocities of the plunger will have a tendency to prevent accurate repetition of the indicator reading. It will also be observed that with plunger 22 in the locked condition any shock on the plunger extensions will be absorbed by the body 16 of the gage and prevented from being transmitted through stem 14 to the operating mechanism of the indicator. Return stop 47, it will also be noted, prevents overtravel of plunger 22 which might otherwise result in injury to the operating mechanism of the indicator.

It will also be noted that the positioning of the conical end portion 48 of return stop screw 47 in relation to the lower inclined wall of opening 45 in plunger 22 and the positioning of adjusting screw 25 in relation to the end surface of indicator stem 14 permits the positioning of the lower end surface of plunger 22 in relation to base surface 20 on body 16 over a substantial range and thus permits the use of plunger extensions such as 27 and 28 to be used for measurements which fall within this adjusting range of the gage unit.

Since the adjustment range of the gage unit is limited, interchangeable plunger extensions are provided to permit use of the gage with work pieces of widely different dimensions and designs. The lengths of these plunger extensions will be in increments equal to the total adjustment range of the gage so that when the maximum or minimum limit of the gage adjustment has been reached with a particular extension a new extension may be mounted on the plunger which will have a dimension suitable for measuring the particular work piece desired.

It will thus be seen that I have provided a gage unit which is compact, sturdy, and not easily damaged. The gage unit is furthermore constructed so as to prevent injury or strain to the delicate operating mechanism of the indicator. It also provides a new and improved mode of gaging which makes for consistently accurate results and prolongs the life of the gage. The provision of removable base member 64 and removable plunger extensions 27 and 28 permits the gage unit to be used interchangeably with gages of different base constructions and with plunger extensions of different design and dimensions to suit a multitude of gaging requirements. This permits standardization of this gage unit, and is conducive to economy in the maintenance and construction of gaging equipment.

I claim:

1. A gage unit for use with an indicator of the type having a reciprocable stem and an indicating mechanism arranged to be actuated by said stem comprising a body having means thereon for supporting said indicator, an axially slidable plunger in said body, means for connecting said plunger with said stem so that said indicating mechanism is actuated by said plunger when the plunger moves in one direction, stop means on said body engageable with said plunger for limiting the axial movement of said plunger in said one direction to a position within the operating range of said indicator whereby when said plunger is engaged against said stop, shocks imparted to said plunger are absorbed by said body and prevented from being transmitted to said stem and indicating mechanism, and including resilient means on said body acting on and biasing said plunger in a direction opposite to said one direction and including cam means on said body engageable with said plunger to move said plunger in said one direction to a position engaging said stop means and being movable to release said plunger, whereby when said cam means are released said plunger moves in said opposite direction under the influence of said resilient means.

2. The combination set forth in claim 1 wherein said plunger and cam means are operatively connected such that said plunger is movable under the influence of said resilient means in a direction outwardly of said body in response to movement of said cam means whereby the velocity with which said plunger moves outwardly from said position in engagement with said stop means under the influence of said resilient means may be controlled by controlling the rate at which said cam means are moved to release said plunger.

3. The combination set forth in claim 1 wherein said stop means on said body limits the movement of said plunger in a direction inwardly of said body to a predetermined adjustable position within the range of movement of said indicating mechanism.

4. In combination with an indicator of the type having a reciprocable stem and an indicating mechanism arranged to be operated by said stem, a gage unit comprising a body, means on said body for supporting said indicator, a plunger in said body axially slidable in a direction inwardly and outwardly of said body, means for operatively connecting said stem and plunger so that said indicating mechanism is actuated by said plunger when the plunger moves inwardly of the body, stop means on said body for limiting the axial movement of said plunger in a direction inwardly of the body to a predetermined adjustable position within the operating range of said indicating mechanism, said connecting means being accessible and actuatable to disconnect said stem and plunger while said indicator is supported by said body and said plunger is slidably engaged in said body so that said indicating mechanism will not be responsive to movement of said plunger, whereby when said gage is being adjusted for a work piece of particular dimension, said connecting means may be actuated to disconnect said plunger from said stem prior to adjustment of said stop means to the desired setting within the operating range of said indicating mechanism, and when said stop means are adjusted to the desired setting and said connecting means actuated to connect said plunger and stem, said plunger is thereafter prevented from moving axially in an inwardly direction to a position beyond the operating range of said indicating mechanism.

5. The combination set forth in claim 4 wherein said means for operatively connecting said plunger and stem comprise a screw threaded on said plunger and engageable with the end of said stem, said screw being adjustable to shift said stem axially to obtain an initial setting of said indicating mechanism and being retractable to a position free of said stem when the plunger is in its innermost position in said body whereby when said screw is adjusted to said position free of said stem, said indicating mechanism is effectively disconnected from and incapable of being actuated by said plunger.

6. The combination as set forth in claim 4 including an extension member removably secured to one end of said plunger, said extension member having the end thereof forming a work contacting surface.

7. A gage unit comprising a body having a bore therein, a plunger slidable axially within said bore and having one end thereof projectable in a direction outwardly of said body, an indicating device operatively associated with said plunger, a stop on said body for limiting the movement of said plunger inwardly of said body, and releasable means on said body engageable with said plunger for retaining said plunger against said stop, whereby when said releasable means are actuated to retain said plunger against said stop any shock to the projecting end of said plunger tending to move said plunger axially inwardly is absorbed by said body and not transmitted to said indicating device.

8. The combination set forth in claim 7 wherein said releasable means comprises a stud on said body movable in a rectilinear path transversely of the path of movement of said plunger, said plunger having a generally V-shaped notch therein, said stud being movable to a position where the end of said stud projects into and is engaged by said V-shaped notch to retain said plunger against said stop.

9. The combination set forth in claim 7 including resilient means acting on and biasing said plunger in a direction outwardly of said body, said plunger provided with a notch therein having a side wall inclined to the axis of the plunger, said releasable means comprising a stud in said body movable in a direction transversely of the axis of said plunger and having an end portion thereof engageable with the inclined side wall of said notch to limit the movement of said plunger in an outward direction, said stud being movable to retract said end portion out of said notch, whereby as said stud is retracted, said biasing means urge said plunger outwardly and maintain said inclined side wall in engagement with said end portion of said stud whereby the rate at which said plunger moves outwardly may be controlled by the rate at which said stud is retracted.

10. In combination with an indicator of the type having a reciprocable stem and an indicating mechanism arranged to be operated by said stem, a gage unit comprising a body having a bore therein, means on said body for supporting the indicator thereon, a plunger slidable axially in said bore, a screw threaded in one end of said plunger and having an end portion engageable with the end of said stem so as to actuate said stem in response to axial movement of said plunger, said plunger having a socket at the other end thereof providing access to the head of said screw whereby when said plunger is in a fixed position in said bore, said screw may be adjusted to vary the setting of said indicating mechanism relative to said fixed position of said plunger.

11. In combination with an indicator having an axially reciprocable stem arranged to operate an indicating mechanism, a gage unit comprising a body having an axially slidable plunger therein, means for mounting said indicator on said body, said body having a planar gaging surface, said plunger being slidable in a direction transversely of said gaging surface, means including a screw threaded into said plunger and contacting the end of said stem for operatively connecting said plunger with said stem, means on said body forming an opening through which said screw is accessible when said indicator is mounted on said body, said screw being adjustable to vary the setting of said indicating mechanism relative to said plunger.

12. A gage unit comprising a body having a bore therein, a plunger slidable axially within said bore, resilient means acting on and biasing said plunger axially in one direction, said plunger having a notch therein presenting a surface angularly inclined to the axis of the plunger, said body having a second bore intersecting said first bore and inclined axially to the plane of said inclined surface, and a detent movable axially in said second bore, said detent having an end portion engageable with and disposed in the path of movement of said inclined surface, said biasing means biasing said plunger into engagement with said detent whereby when said detent is moved in said second bore toward and in engagement with said inclined end surface, said plunger is shifted axially in one direction by reason of the engagement of the end portion of said detent with said inclined surface and when said detent is moved in a direction away from said inclined surface, said plunger is shifted under the influence of said biasing means in a direction opposite to that previously mentioned.

13. In combination with an indicator of the type having a reciprocable stem and an indicating mechanism arranged to be operated by said stem, a gage unit comprising a body having a planar gaging surface, means for supporting said indicator on said body, a plunger slidable axially in said body along a path substantially perpendicular to said gaging surface, means for operatively connecting said plunger and said stem so that said stem is actuated in response to axial movement of said plunger, said connecting means being adjustable to set said indicating mechanism at a predetermined initial setting for different positions of said plunger, means on said body providing an access opening for said connecting means to enable adjustment thereof while the indicator is supported on the body, and stop means in said body for limiting the axial movement of said plunger to a predetermined adjustable position whereby after said stop means are adjusted to limit the movement of said plunger to a desired position, said connecting means may be adjusted through said access opening to set said indicating mechanism to said initial setting so that displacement of said plunger from said predetermined position is indicated by the deviation of said indicating mechanism from said initial setting.

14. The combination set forth in claim 13 wherein said stop means comprises a stud in said body movable axially in a path transversely of and intersecting the path of movement of said plunger, said plunger having a conical socket therein, said stud having a conical head portion engagable with the walls of said conical socket in said plunger.

15. The combination set forth in claim 13 wherein said connecting means comprises a screw threaded on said plunger and advanceable into and out of engagement with an end of said stem.

16. In combination with an indicator of the type having a reciprocable stem and an indicating mechanism arranged to be operated by said stem, a gage unit comprising a body having a bore therein, means on said body for mounting said indicator thereon, a plunger slidable axially in said bore in a direction inwardly and outwardly of said body, means operatively connecting said stem and said plunger so that said indicating mechanism is actuated by said plunger when the plunger moves inwardly of the body, stop means on said body engageable with said plunger for limiting the movement of said plunger in a direction inwardly of the body to a predetermined adjustable position within the operating range of said indicating mechanism whereby overtravel of said plunger in an inwardly direction and consequent injury to said indicating mechanism is prevented, said plunger being provided with a pair of opposed surfaces angularly inclined relative to the axis of the plunger, and a pair of stud members on said body movable axially into engagement with said opposed inclined surfaces, said stud members having end portions providing surfaces inclined similarly to said opposed surfaces for engagement therewith, one of said stud members and opposed surfaces comprising said stop means and the other of said stud members and opposed surfaces providing means for retaining said plunger against said stop means.

17. In combination with an indicator of the type having a reciprocable stem and an indicating mechanism arranged to be operated by said stem, a gage unit comprising a body having a bore therein, means on said body for mounting said indicator thereon, a plunger slidable axially in said bore in a direction inwardly and outwardly of said body, means operatively connecting said stem and said plunger so that said indicating mechanism is actuated by said plunger when the plunger moves inwardly of the body, stop means on said body engageable with said plunger for limiting the movement of said plunger in a direction inwardly of the body to a predetermined adjustable position within the operating range of said indicating mechanism whereby overtravel of said plunger in an inwardly direction and consequent injury to said indicating mechanism is prevented, said plunger being provided with a pair of opposed conical openings, a pair of axially movable stud members on said body, said stud members having conical end portions engageable with the walls of said conical openings, and means biasing said plunger in a direction outwardly of said body, one of said stud members and conical openings comprising said stop means and the other of said stud members and conical openings providing means for holding said plunger in a retracted position in said body.

HANS J. LOVENSTON.

References Cited in the file of this patent

UNITED STATES PATENTS

| Number | Name | Date |
|---|---|---|
| 1,683,710 | Zitzmann | Sept. 11, 1928 |
| 2,324,998 | Dague | July 20, 1943 |
| 2,401,085 | Lo Valley | May 28, 1946 |